United States Patent [19]

Kadono et al.

[11] Patent Number: 5,196,930
[45] Date of Patent: Mar. 23, 1993

[54] HIGH EFFICIENCCY CODING AND DECODING APPARATUS FOR LOWERING TRANSMISSION OR RECORDING RATE OF TRANSMITTED OR RECORDED VIDEO SIGNAL WITHOUT REDUCING PICTURE QUALITY

[75] Inventors: Shinya Kadono, Katano; Tatsuro Juri, Osaka, both of

[73] Assignee: Matsushita Electric Industrial Co., Ltd., Osaka, Japan

[21] Appl. No.: 731,311

[22] Filed: Jul. 17, 1991

[30] Foreign Application Priority Data

Jul. 20, 1990 [JP] Japan ............................... 2-193627
Aug. 21, 1990 [JP] Japan ............................... 2-220910
Oct. 19, 1990 [JP] Japan ............................... 2-282119

[51] Int. Cl.⁵ .............................................. H04N 7/12
[52] U.S. Cl. ............................................... 358/133
[58] Field of Search .............. 358/133, 432, 433, 135, 358/136; 382/41

[56] References Cited

U.S. PATENT DOCUMENTS 4,849,812  7/1989  Borgers et al. .
5,073,820  12/1991  Nakagawa et al. ............... 358/133

FOREIGN PATENT DOCUMENTS

0250152A3  12/1987  European Pat. Off. .
3304835A1   8/1984  Fed. Rep. of Germany .
2608808A1   2/1988  France .
WO88/07725  10/1988  PCT Int'l Appl. .

OTHER PUBLICATIONS

"Scene Adaptive Coder", Wen-Hsiung Chen et al., IEEE Transactions On Communications vol. Com-32, No. 3, Mar. 1984, pp. 225-232.

"A Fast Algorithm for the Cosine Transform Based on Successive Order Reduction of the Tchebycheff Polynomial", Yoshitaka Morikawa et al., 1985/2 vol. J86-A No. pp. 173-179.

*Primary Examiner*—Victor R. Kostak
*Attorney, Agent, or Firm*—Wenderoth, Lind & Ponack

[57] ABSTRACT

In a high efficiency coding apparatus for performing plural different types of orthogonal transformation, by reordering the signals after orthogonal transformation and transforming into signals of same statistic characteristics, distortion of coding efficiency due to mismatching of the characteristics of coding device is reduced even if the output of the orthogonally transformed signal is coded by one fixed coding device.

9 Claims, 10 Drawing Sheets

HIGH EFFICIENCCY CODING AND DECODING APPARATUS FOR LOWERING TRANSMISSION OR RECORDING RATE OF TRANSMITTED OR RECORDED VIDEO SIGNAL WITHOUT REDUCING PICTURE QUALITY

BACKGROUND OF THE INVENTION

1. Field of the Invention

The present invention relates to a high efficiency coding apparatus used for the purpose of lowering the transmission rate or recording rate periodically without reducing the picture quality of a video signal when transmitting or recording the video signal.

2. Description of the Prior Art

When coding a video signal, in a still picture, coding within a frame is higher in efficiency than coding within a field, while, in a moving picture, it is known that coding within a field is lower in coding distortion than coding within a frame and is hence enhanced in coding efficiency. Therefore, to enhance the coding efficiency, two types of orthogonal transformations are required, that is, the orthogonal transformation suited to coding within a frame and the orthogonal transformation suited to coding within a field.

In the conventional high efficiency coding apparatus, however, for plural orthogonal transformations, plural orthogonal transforming devices and coding devices corresponding to the plural orthogonal transforming devices were necessary. For example, an orthogonal transforming device for coding within frame and a coding device for coding within frame, an orthogonal transforming device for coding within frame and a coding device for coding within frame are necessary. In particular, the coding device is complicated in processing as compared with the orthogonal transforming device, and hence the hardware scale is increased.

SUMMARY OF THE INVENTION

It is hence a primary object of the invention to present a high efficiency coding apparatus for performing an orthogonal transformation adaptively selected from plural orthogonal transformations on a video signal so that the lowering of the coding efficiency due to mismatching of the orthogonal transformations may be less in video signals with different characteristics such as still pictures and moving pictures, without practically increasing the hardware scale as compared with the conventional high efficiency coding apparatus having one orthogonal transforming device.

To achieve the above object, a high efficiency coding apparatus of the invention comprises an orthogonal transforming device for performing at least two types of orthogonal transformations on a digital video input signal divided into blocks, a reordering device for selecting and reordering one of output signals of the orthogonal transforming device, and a coding device for coding an output signal of the reordering device by a specific technique regardless of the type of orthogonal transformation.

A high efficiency decoding apparatus of the invention comprises a decoding device for decoding a coded input signal, a reordering device for reordering an output signal of the decoding device, and an orthogonal transforming device for performing at least two types of orthogonal transformations on an output signal of the reordering device.

The video signal is orthogonally transformed by the orthogonal transforming device, and is coded by the coding device. At least two orthogonal transforming devices execute at least two types of different orthogonal transformations, but it is not always necessary to calculate plural orthogonal transformations at the same time. The output signal from the orthogonal transforming device is reordered in data by the reordering device. The purpose of reordering is to standardize the statistical characteristics of the signal processed by plural types of orthogonal transformations into one type. If there is only one statistical characteristic, distortion of coding efficiency due to mismatching of a coding device does not occur even if there is only one coding device necessary for coding the data. As a result, as compared with the conventional high efficiency coding apparatus composed of one orthogonal transforming device and one coding device, by only a slight increase of the hardware scale, a high efficiency coding apparatus with a high coding efficiency can be composed. The hardware may be further simplified by performing a special orthogonal transformation as plural orthogonal transformations, and such a orthogonal transformation is described in detail in the embodiments.

Besides, since the coding device, of the high efficiency coding apparatus is only of one type, the decoding device of the high efficiency decoding apparatus may be also be of one type, which is enough for decoding the signal coded by the high efficiency coding apparatus. Therefore, the coded input signal is decoded by the decoding device, and is reordered in the manner reverse to the reordering of the data conducted in the high efficiency coding apparatus. The reordered data is orthogonally transformed in the transformation inverse to the orthogonal transformation conducted in the high efficiency coding apparatus. Therefore, the orthogonal transforming device of the high efficiency decoding apparatus can be realized in accordance with a small hardware scale equivalent to the present orthogonal transforming device of the high efficiency coding apparatus.

DESCRIPTION OF THE PREFERRED EMBODIMENTS

Figure 1:
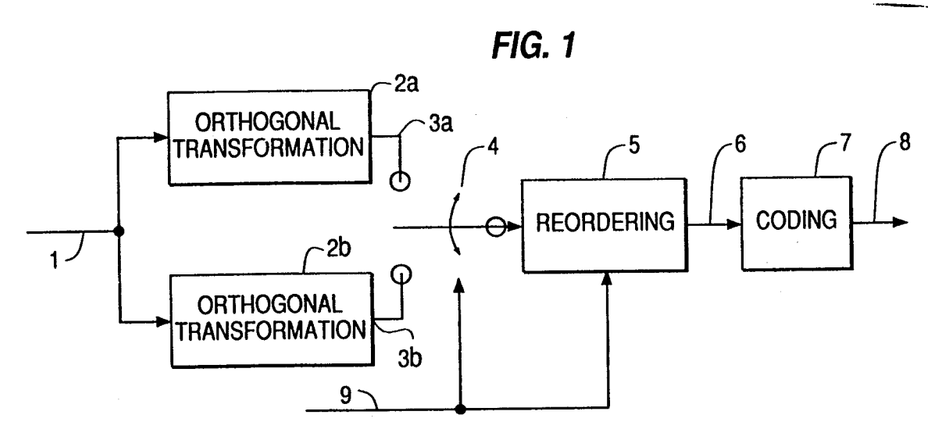
FIG. 1 is a block diagram of a high efficiency coding apparatus in a first embodiment of the invention.

FIG. 1 is a block diagram of a high efficiency coding apparatus in accordance with a first embodiment of the present invention. In the diagram, numeral 1 denotes an input signal; elements 2a, 2b are orthogonal transforming devices; elements 3a 3b are output signals of orthogonal transforming devices; element 4 is a selectro; element 5 is a reordering device; element 6 is a reordered output; element 7 is a coding device; element 8 is a coded output signal, and element 9 is a changeover signal.

The embodiment shown in FIG. 1 is explained below. The input signal 1 is a digital video signal formed in blocks, which are orthogonally transformed by orthogonal transforming devices 2a and 2b. Either one of the output signals 3a and 3b from the orthogonal transforming devices 2a 2b is selected by the selector 4 according to the externally provided changeover signal 9, and the reordering device 5 reordered in the order of the data indicated by the changeover signal 9, and delivered as signal 6. The changeover signal 9 is a signal generated by a motion detector or the like outside the orthogonal transforming device. For example, if the orthogonal transforming device 2a is for processing within a frame and the orthogonal transforming device 2b is for processing within a field, by applying the orthogonal transformation of the orthogonal transforming device 2a to a still picture and the orthogonal transformation of the orthogonal transforming device 2b to a moving picture, the high time axis correlation in the still picture is utilized, and the coding efficiency becomes high. Therefore, when judged to be a still picture by the motion detector, the changeover signal 9 commands the selector 4 to output signal 3a and to reorder the signal to suit to the signal 3a, and when judged to be a moving picture by the motion detector, the changeover signal 9 commands the selector 4 to output signal 3b and to reorder the signal to suit to the signal 3b. The signal 6 is coded by a specific coding technique by the coding device 7 to become a coded output signal 8. The reordering device 5 is intended to reorder so as to minimize the lowering of coding efficiency due to mismatching of the statistic characters of the signals 3a and 3b when coding the signal 3a or 3b orthogonally transformed by the orthogonal transforming device 2a or 2b by one coding device 7. Therefore, if the statistical characters of the signals 3a and 3b do not resemble one another after reordering, coding by the coding device 7 is difficult, and a large coding distortion may be produced, or the compression rate increase significantly, and therefore the reordering by the reordering device 5 is very important.

Thus, according to the foregoing embodiment, by reordering the signals orthogonally transformed by the plural orthogonal transforming devices, the coding efficiency is enhanced even if coded by one coding device.

Figure 2A:
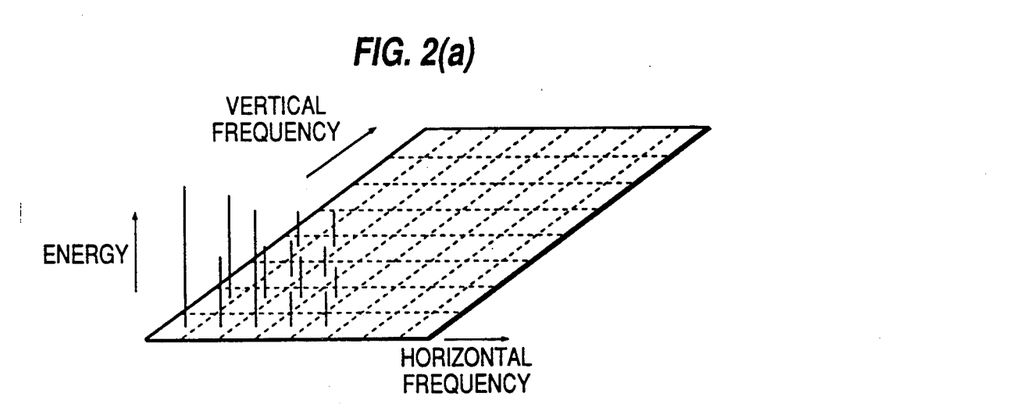
FIGS. 2(a)-2(c) are explanatory diagrams showing the energy distribution of orthogonally transformed signals.
Figure 2B:
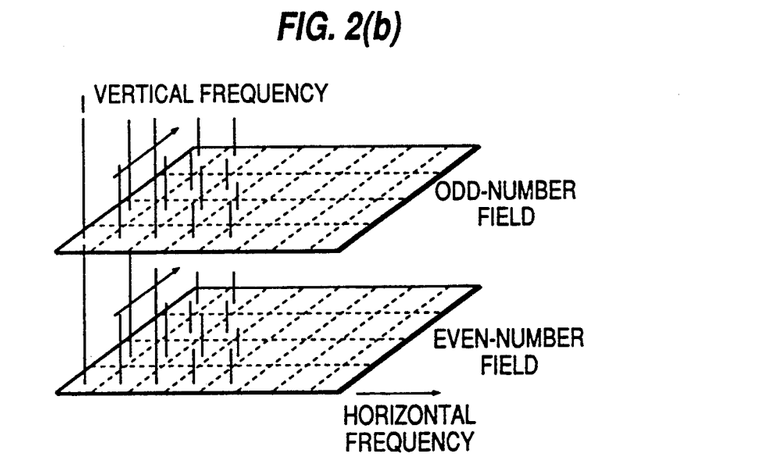
Figure 2C:
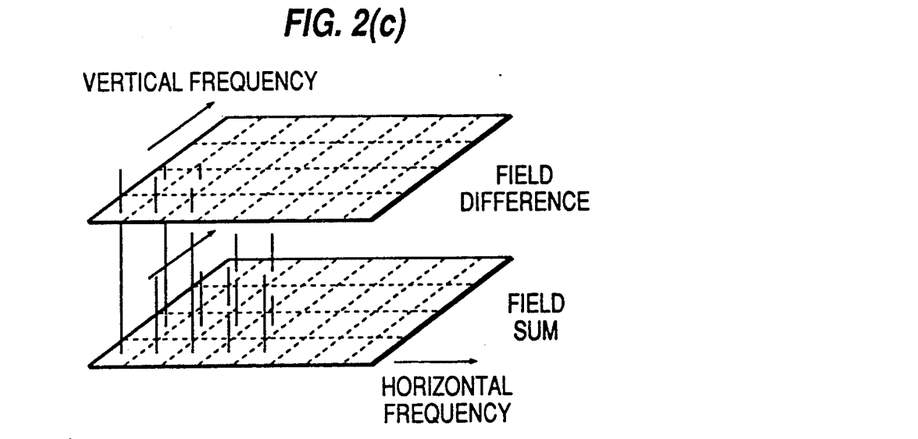
Figure 3A:
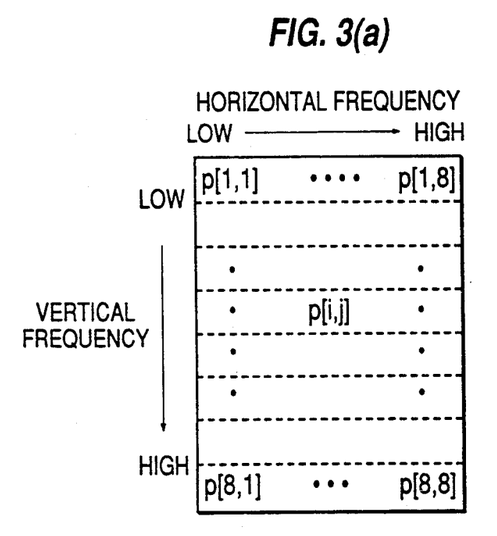
FIGS. 3(a)-3(c) are explanatory diagram for reordering of the high efficiency coding apparatus of the first embodiment.
Figure 3B:
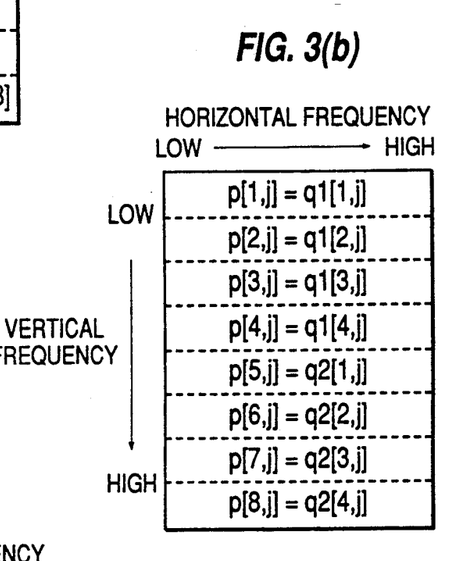
Figure 3C:
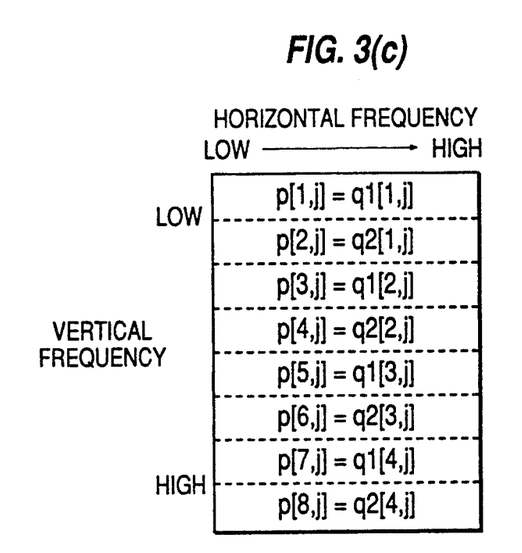

As a practical example of an orthogonal transformation, a case of an orthogonal transformation of 8 points×8 points in a block composed of vertical 8 points and horizontal 8 points of signal within a frame, and a case of an orthogonal transformation of an 4 points×8 points in a block composed of vertical 4 points and horizontal 8 points of signal within a field are explained below. An energy distribution of signal of 8 points×8 points orthogonal transformation in a frame to video signal is shown in FIG. 2 (a). The 4 points×8 points orthogonal transformation in a field is shown in FIG. 2 (b), in which a further correlation exists between fields, and it is more suited to high efficiency coding to obtain the sum and difference between fields. The sum and difference between fields obtained in each component of 4 points×8 points orthogonal transformation in a field are shown in FIG. 2 (c). In order to code the data distributed as shown in FIG. 2 (a) and the data distributed as shown in FIG. 2 (c) efficiently by one coding technique, it is necessary that both statistical characteristics be similar to each other. Here is explained the technique of reordering the data distributed as shown in FIG. 2 (c) into the data of 8 points×8 points having an energy distribution as shown in FIG. 2 (a). Supposing the sum component between the fields in FIG. 2 (c) to be q1[i, j], and the difference component to be q2 [i, j], $1 \leq i \leq 4$, $1 \leq j \leq 8$, the reordered component is assumed to be p [i, j], $1 \leq i \leq 8$, $1 \leq j \leq 8$. Meanwhile, the smaller one of each subscript of p, q1, q2 is supposed to express the lower frequency, and the larger subscript denotes the higher frequency component. The correspondence between p [i, j] and frequency is shown in FIG. 3 (a). When transformed from q1, q2 into p, the lower the frequency component, the larger is the energy, so as to be close to the distribution in FIG. 2 (a). Assuming a quasi-still picture, the magnitude of the energy of q2 is estimated to be very small as compared with q1. Therefore, as shown in FIG. 3 (b), when q2 is put next to the higher order component of q1, it is supposed to be arranged in the order of the magnitude of energy. On the other hand, in a moving picture, the energies of q1 and q2 are supposed to be nearly the same in magnitude. Accordingly, as shown in FIG. 3 (c), when components of q1 and q2 are arranged alternately, it is assumed to be arranged in the sequence of energy magnitude. By such a reordering, the components of 8 points×4 points orthogonal transformation in a field may be transformed into the distribution similar to the distribution of the 8 points× 8 points orthogonal transformation in frame in a purely still picture or a moving picture, and when shared by one coding device an increase in the coding distortion due to the mismatching of the coding characteristics may be reduced. Incidentally, in the reordering of the 8 points×4 points orthogonal transformation, the reordering is changed between the quasi-still picture and moving picture, but the reordering of the 8 points×4 points orthogonal transformation may be fixed in either FIG. 3 (b) or FIG. 3 (c), by allowing a little distortion of the picture quality of either the quasi-still picture or moving picture.

Figure 4:
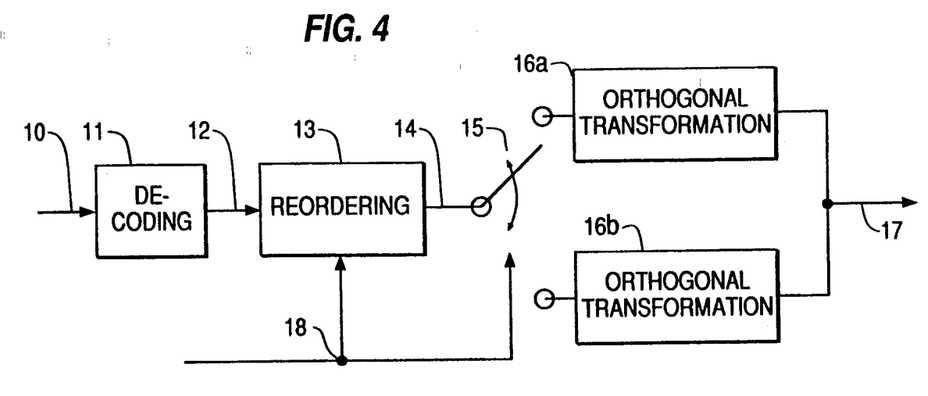
FIG. 4 is a block diagram of a high efficiency decoding apparatus in accordance with a second embodiment of the invention.

FIG. 4 shows a high efficiency decoding apparatus in accordance a second embodiment of the present invention. In the diagram, numeral 10 denotes a coded signal;

element 11 is a decoding device; element 12 is a decoded signal; element 13 is a reordering device; element 14 is a reordered signal; element 14 is a selector; elements 16a and 16b are orthogonal transforming devices, 17 is a orthogonally transformed signal or an output signal, and element 18 is a changeover signal.

The operation of the high efficiency decoding apparatus shown in FIG. 4 is explained below. The coded signal 10 is decoded by the decoding device 11 into a decoded signal 12. The decoded signal 12 is reordered in the data sequence by the reordering device 13, and is orthogonally transformed by either the orthogonal transforming device 16a or 16b selected by the selector 15. The reordering by the reordering device 13 and the change-over by the selector 15 are controlled by the changeover signal 18. This changeover signal 18 corresponds to the changeover signal 9 in FIG. 1, and it issues a command to the reordering device 13 so as to reorder reversely to the reordering by the reordering device 5. It also issues a command to the selector 15 so as to select the orthogonal transformation inverse to the orthogonal transformation in FIG. 1. The signal 17 orthogonally transformed by the selected orthogonal transforming device 16a or 16b becomes an output signal of the high efficiency decoding apparatus.

Figure 5:
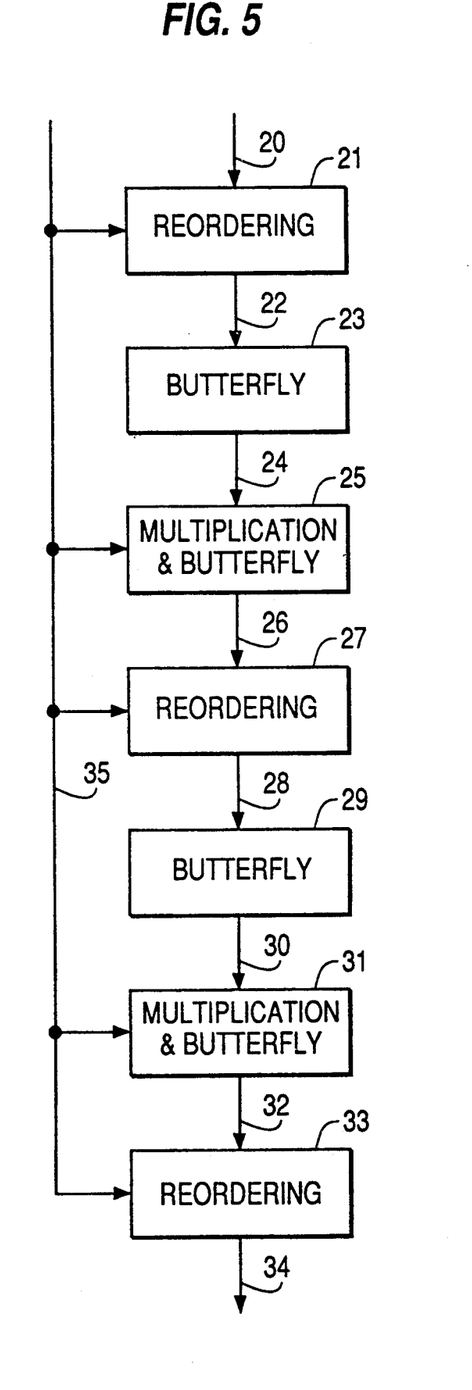
FIG. 5 is a block diagram of an orthogonal transforming device which is a part of a high efficiency coding apparatus in accordance with a third embodiment of the invention.

FIG. 5 is a block diagram of an orthogonal transforming device for composing a high efficiency coding apparatus in accordance with a third embodiment of the present invention. This embodiment is intended to assemble the orthogonal transforming devices 2a and 2b, and the reordering device 5 in the embodiment in FIG. 1, and realize them by one orthogonal transforming device. In the diagram, numeral 20 is an input signal; element 21 is a reordering device; element 22 is a reordered output signal; element 23 is a butterfly calculation unit; element 24 is a butterfly calculation output signal element 25 is a multiplication & butterfly calculation unit; element 26 is a multiplication & butterfly calculation output signal; element 27 is a reordering device; element 28 is a reordered output signal; element 29 is a butterfly calculation unit; element 30 is a butterfly calculation output signal; element 31 is a multiplication & butterfly calculation unit; element 32 is a multiplication & butterfly calculation output; element 33 is a reordering device; element 34 is a reordered output signal, and element 35 is a changeover signal. The signal 35 corresponds to the changeover signal 9 in FIG. 1.

Figure 6:
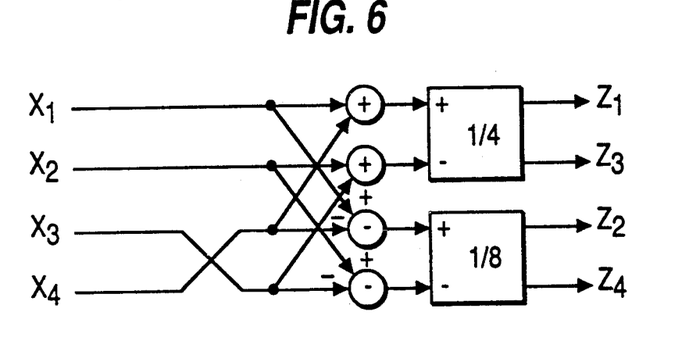
FIG. 6 is a signal diagram of a four-point discrete cosine transformation.
Figure 7:
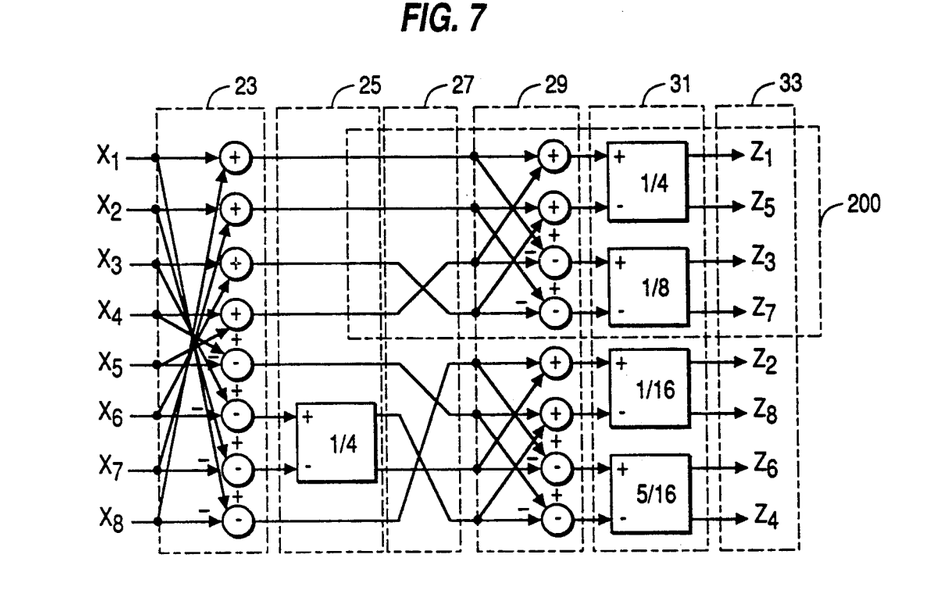
FIG. 7 is a signal diagram of an eight-point discrete cosine transformation.
Figure 8:
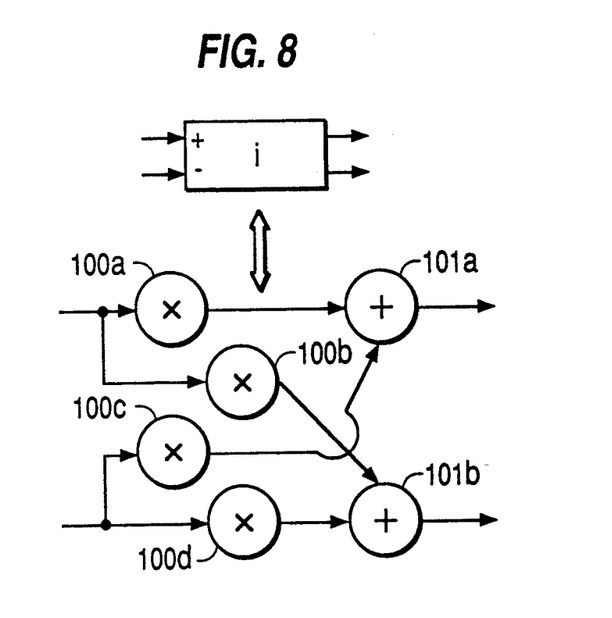
FIG. 8 is an explanatory diagram of a multiplication and butterfly calculation.
Figure 9:
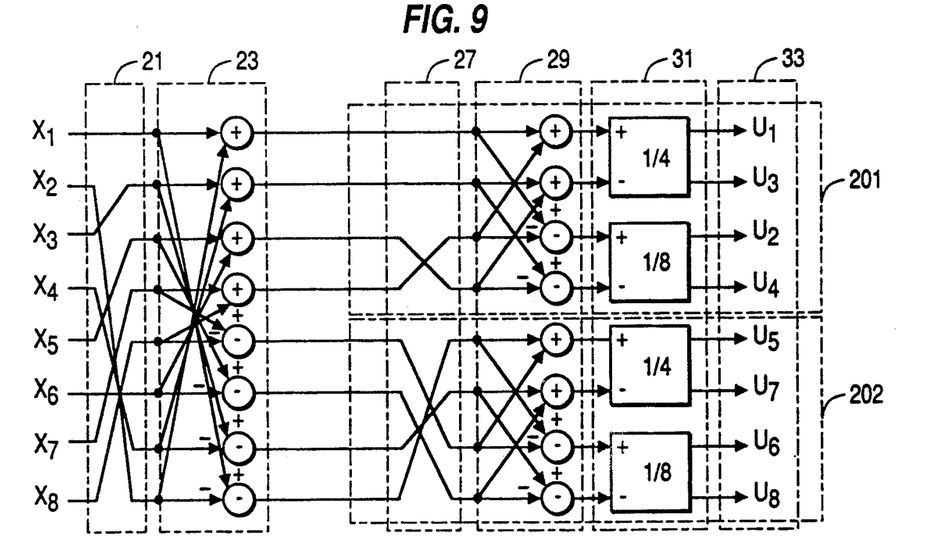
FIG. 9 is a signal diagram a sum and difference a four-point discrete cosine transformation.

The operation of the third embodiment is explained below. This orthogonal transforming device is intended to transform eight pieces of data by either an eight-point discrete cosine transformation, or a four-point×two-point discrete cosine transformation. In this case, the four-point×two-point discrete cosine transformation is a two-dimensional discrete cosine transformation for performing a four-point discrete cosine transformation and a two-point discrete cosine transformation in independent directions. First of all, signal diagrams of four-point discrete cosine transformation and two-point discrete cosine transformation are shown in FIG. 6 and FIG. 7. By the processing of these signal diagrams, from the input signal of $X_1, \ldots, X_4$ or $X_1 \ldots, X_8$, the orthogonally transformed signal $Z_1, \ldots, Z_4$ or $Z_1, \ldots, Z_8$ will be obtained. Incidentally, a rectangular symbol denotes multiplication, which is realized in the composition shown in FIG. 8. In FIG. 8, element 100a, 100b, 100c, 100d are multipliers, and when the rectangular symbol is i, it means to multiply $\cos(i\cdot\pi)$, $\sin(i\cdot\pi)$, $\sin(i\cdot\pi)$, $-\cos(i\cdot\pi)$, respectively. Besides, elements 101a and 101b are adders. Usually, two orthogonal transforming devices are necessary for performing both orthogonal transformations of an eight-point discrete cosine transformation and a four-point×two-point discrete cosine transformation. However, the operation in FIG. 6 the same as 200 of processing in FIG. 7, and it is found possible to compose in the equipment excluding the first butterfly calculation unit 23 and the first multiplication & butterfly calculation unit 25 from the orthogonal transforming device in FIG. 7. Here, in the case of a four-point×two-point discrete cosine transformation, the two-point discrete cosine transformation or the calculation of sum and difference of data can be done by the first butterfly operation unit 23 in FIG. 7. From such viewpoint, from the input signal $X_1, \ldots, X_8$, the signals $U_1, U_2, U_3, U_4$ and $U_5, U_6, U_7, U_8$ after four-point×two-point discrete cosine transformation of $X_1+X_2, X_3+X_4, X_5+X_6, X_7+X_8$ and $X_1-X_2, X_3-X_4, X_5-X_6, X_7-X_8$ may be expressed in the signal diagram in FIG. 9. In FIG. 9 elements 201 and 202 are the portions for calculating the four-point discrete cosine transformation. The equipment compositions in FIG. 7 and FIG. 9 are similar, and from this viewpoint it is the orthogonal transforming device in FIG. 5 that is composed to perform the orthogonal transformation in either FIG. 7 or FIG. 9. The operations of the devices in FIG. 5 are indicated by attaching the same numbers in FIG. 7 and FIG. 9. The changeover signal 35 is, an externally provided signal, which changes over the eight-point discrete cosine transformation and the four-point×two-point discrete cosine transformation. The reordering device 21 is not necessary in the eight-point discrete cosine transformation in FIG. 7, but is needed in the four-point×two-point discrete cosine transformation in FIG. 8, and it is changed over by the changeover signal 35. The butterfly calculation unit 23 operates commonly in the eight-point discrete cosine transformation and four-point×two-point discrete cosine transformation. The multiplication & butterfly calculation unit 25 is required in part of the calculation in the eight-point discrete cosine transformation, and it is changed over by the changeover signal 35 to the perform multiplication and butterfly calculation only when necessary. Since the reordering device 25 differs in the reordering sequence between the eight-point discrete cosine transformation and four-point×two-point discrete cosine transformation, it is changed over by the changeover signal 35 to as to reorder in a specified order. The butterfly calculation unit 29 operates commonly in the eight-point discrete cosine transformation and four-point×two-point discrete cosine transformation. The multiplication & butterfly calculation unit 31 differs in the multiplier between the eight-point discrete cosine transformation and the four-point×two-point discrete cosine transformation, and it is changed over by the changeover signal 35 so as to multiply by the specified multiplier. Finally, it is reordered by the reordering device 33 to deliver the data in the sequence suited to the next calculation or in the sequence of the magnitude of the frequency respectively in the eight-point discrete cosine transformation and four-point×two-point discrete cosine transformation, and this rearranging sequence differs between the eight-point discrete cosine transformation and four-point×two-point discrete cosine transformation, and it is selected by the changeover signal 35.

Thus, according to this embodiment, since the four-point discrete cosine transformation and the sum and difference between fields may be calculated in the calculation circuit of an eight-point discrete cosine transformation, two types of orthogonal transformation of an eight-point discrete cosine transformation and a four-point×two-point discrete cosine transformation may be realized in the hardware scale corresponding nearly to one circuit of an eight-point discrete cosine transformation.

Figure 10:
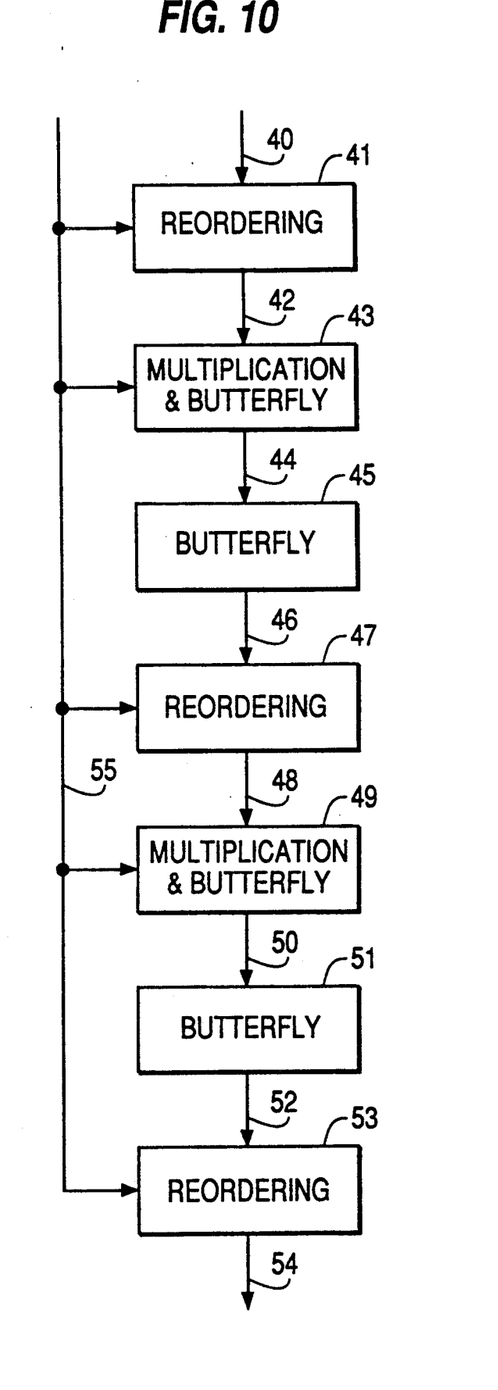
FIG. 10 is a block diagram of an orthogonal transforming device which is a part of a high efficiency decoding apparatus in accordance with a fourth embodiment of the present invention.

FIG. 10 relates to a fourth embodiment, and is a block diagram of an orthogonal transforming device for performing an inverse orthogonal transformation of the orthogonal transformation shown in FIG. 5. In the diagram, numeral 40 denotes an input signal; element 41 is a reordering device; element 42 is a reordering device output signal; element 43 is a multiplication & butterfly calculation unit; element 44 is a multiplication & butterfly calculation unit output signal; element 45 is a butterfly calculation unit; element 46 is a butterfly calculation unit output signal; element 47 is a reordering device, 48 is a reordering device output signal; element 49 is a multiplication & butterfly calculation unit; element 50 is a multiplication & butterfly calculation unit output signal; element 51 is a butterfly calculation unit; element 52 is a butterfly calculation unit output signal; element 53 is a reordering device; element 54 is a reordering device output signal, and element 55 is a changeover signal.

Figure 11:
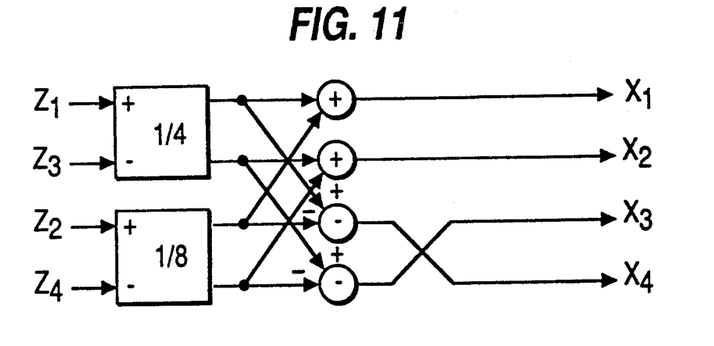
FIG. 11 is a signal diagram of a four-point inverse discrete cosine transformation.
Figure 12:
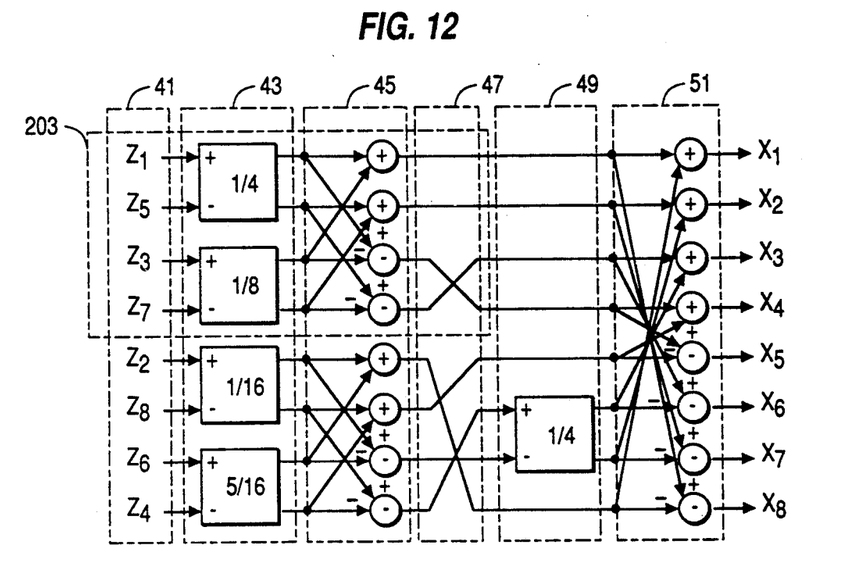
FIG. 12 is a signal diagram of a eight-point inverse cosine transformation.
Figure 13:
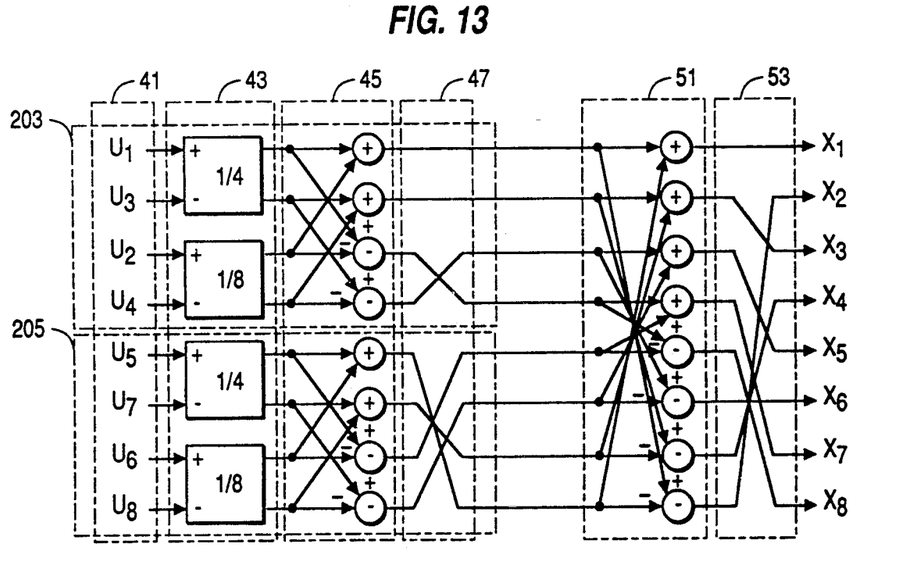
FIG. 13 is a signal diagram of a sum and difference of a four-point inverse discrete cosine transformation.

The operation of the embodiment shown in FIG. 10 is explained below. This orthogonal transforming device is intended to process eight an pieces of data in either eight-point inverse discrete cosine transformation or a four-point×two-point inverse discrete cosine transformation. FIGS. 11 and 12 are signal diagrams of a four-point inverse discrete cosine transformation and an eight-point inverse discrete cosine transformation, respectively. FIG. 11 is an inverse transformation of FIG. 6 and FIG. 12 is an inverse transformation of FIG. 7. However, normalizing constants are omitted. The calculation in FIG. 11 is same as processing 203 in FIG. 12, and therefore by slightly adding to the orthogonal transforming device in FIG. 17, it is known that a four-point×two-point inverse discrete cosine transformation can be done. The orthogonal transformation in FIG. 13 is a signal diagram of a four-point×two-point inverse discrete cosine transformation. Comparing FIG. 12 and FIG. 13, the flows of signal processing are similar, and it is the orthogonal transforming device in FIG. 10 that is designed to calculate both orthogonal transformations by one piece of hardware. Meanwhile, the calculations corresponding to the devices in FIG. 10 are indicated by the same numbers in FIG. 12 and FIG. 13. The signal 55 is a changeover signal for performing either the orthogonal transformation in FIG. 12 or the orthogonal transformation in FIG. 13, and it is externally provided in the same fashion as the changeover signal 35 in FIG. 5. The input signal 40 is reordered in the data sequence in the reordering device 41. This reordering is different between the orthogonal transformations in FIG. 12 and FIG. 13, and it is changed over by the changeover signal 55. The reordered signal 42 is multiplied, added and subtracted in the multiplication & butterfly calculation unit 43. Since the multiplier in this multiplication differs between FIG. 12 and FIG. 13, it is changed over by the changeover signal 55. The signal 44 is subjected to a butterfly calculation commonly in FIG. 12 and FIG. 13 in the butterfly calculation unit 45. The signal 46 is reordered as in FIG. 12 or FIG. 13 in the sequence indicated by the changeover signal 55 by the reordering device 47. The multiplication & butterfly calculation unit 49 is required only in the eight-point discrete cosine transformation in FIG. 12, and it is changed over so as to either multiply or not by the changeover signal 55. The signal 50 is reordered commonly in FIG. 12 and FIG. 13 by the butterfly calculation unit 51, and the data is reordered as in FIG. 12 or FIG. 13 by the command of the changeover signal 55 in the reordered device 53.

Hence, the inverse transformation in FIG. 5 may be also realized by one orthogonal transforming device shown in FIG. 10, and the hardware is outstandingly simplified as compared with the conventional high efficiency coding apparatus requiring plural orthogonal transforming devices.

In the third embodiment, the sharing of the orthogonal transforming device between an eight-point discrete cosine transformation and a four-point×two-point discrete cosine transformation was explained, and in the fourth embodiment, the sharing of the orthogonal transformation device between the eight-point inverse discrete cosine transformation and the four-point×two-point inverse discrete cosine transformation was explained. This embodiment can be, moreover, easily extended, generally, to an m-point orthogonal transforming device (m being a multiple of 2) containing an m/2-point orthogonal transforming device in itself. That is, the m-point orthogonal transforming device requires at least one more adder/subtracter than the m/2-point orthogonal transforming device, and by using this adder/subtracter, a two-point orthogonal transformation, that is, addition and subtraction of data can be done. Therefore, in the same fashion as the orthogonal transforming device in the third embodiment or the orthogonal transforming device in the fourth embodiment, the orthogonal transforming device sharing the m-point orthogonal transformation and m/2-point×2-point orthogonal transformation may be realized in the hardware scale almost same as the m-point orthogonal transforming device.

Figure 15:
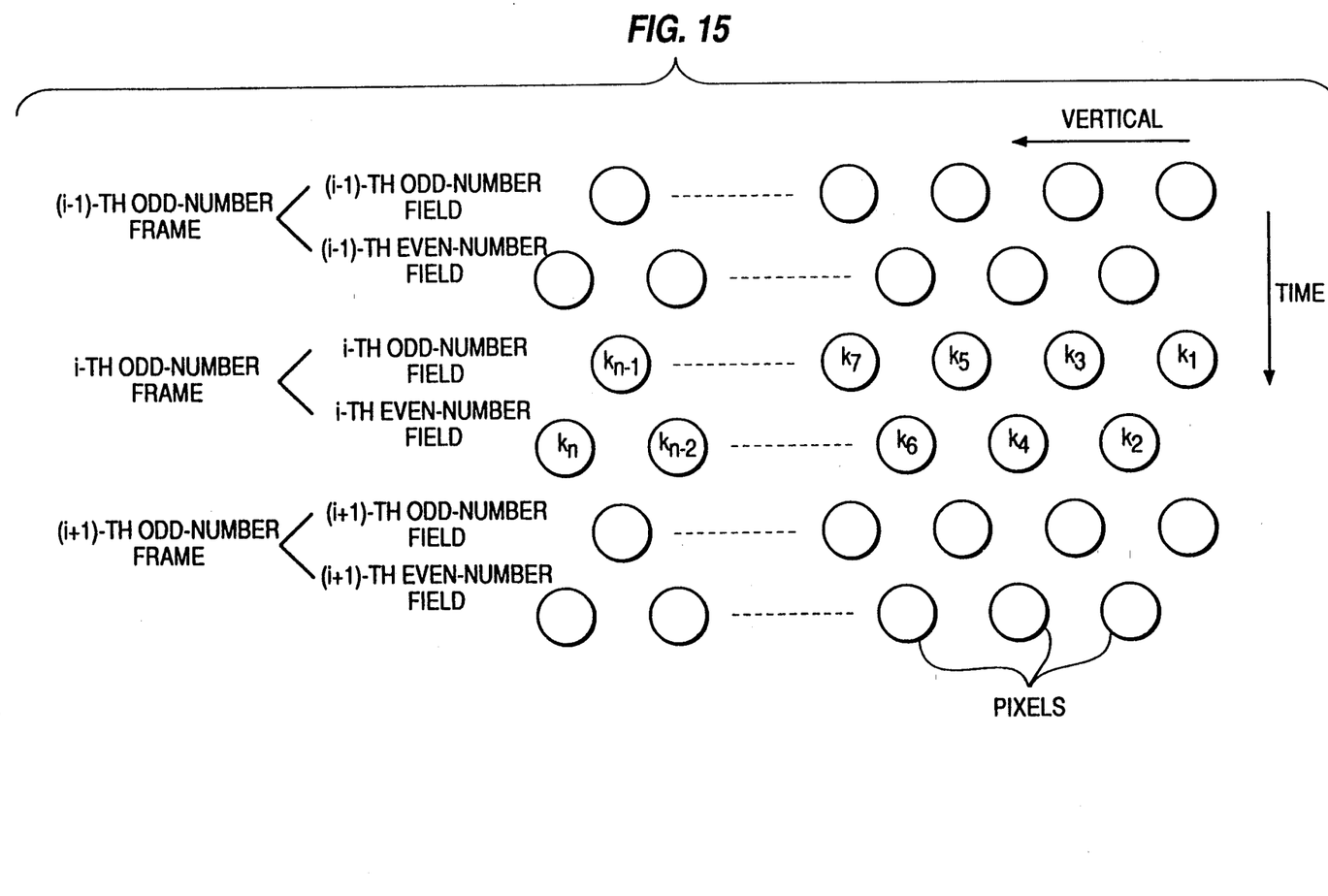
FIG. 15 is an explanatory diagram of the concept of frame and field.
Figure 16:
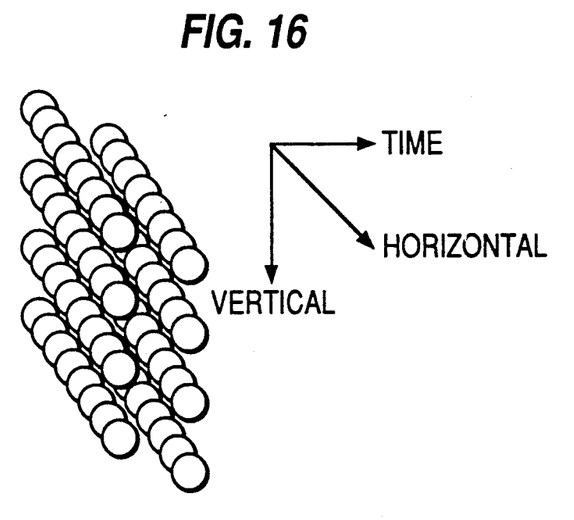
FIG. 16 is a two-dimensional blocking and three-dimensional blocking diagram of an image.

Incidentally, the video signal possesses two time units, that is, frame and field. The relationship of the pixel positions of frame and field is shown in FIG. 15. In FIG. 15, the pixels are expressed by plotting the time on the of abscissas axis and the vertical position on the of ordinates axis. The i-th frame (i being an integer) is composed of the i-th odd-number field and the i-th even-number field, and it must be noted that the odd-number field and even-number field must be deviated in the vertical pixel position by ½ pixel. To compress the video signal efficiently, it is necessary to reorder the pixel data in the sequence of high correlation and transform orthogonally. In the still picture or quasi-still picture small in the time-wise variation of data, it is high in efficient to reorder in the sequence of $k_1, k_2, k_3, \ldots, k_{m-1}, k_m$ and perform m-point orthogonal transformation in the vertical direction. On the other hand, in the case of a moving picture having a time-wise variation of data, since the correlation between pixels in between fields, the coding efficiency may be enhanced by dividing into two sets of $k_1, k_2, k_3, k_5, \ldots, k_{m-1}$, and $k_2, k_4, k_6, \ldots, k_m$ to perform an m/2-point×2-point orthogonal transformation in the vertical direction m/2 points and time-wise direction 2 points. Meanwhile, since the video signal is also strongly correlated in the horizontal direction, as shown in FIG. 16, by dividing n pixels in blocks in the horizontal direction, when the orthogonal transformation of m point×n points and orthogonal transformation of m/2 points×n points×2 points are change over between the quasi-still picture and moving picture, the coding efficiency is further improved.

In the third and fourth embodiments, it is also possible to apply to sine transformation or Fourier transformation, aside from the discrete cosine transformation. In the foregoing embodiments, meanwhile, the eight-point discrete cosine transformation and four-point discrete cosine transformation were explained, but generally when the calculation algorithm of the N-point orthogonal transformation can be recursively composed from the algorithm of N/2 point orthogonal transformation, the sum and difference calculation of either N-point orthogonal transformation or N/2-point orthogonal transformation may be selectively executed by one orthogonal transformation device in a hardware scale similar to the N-point orthogonal transformation.

Figure 14A:
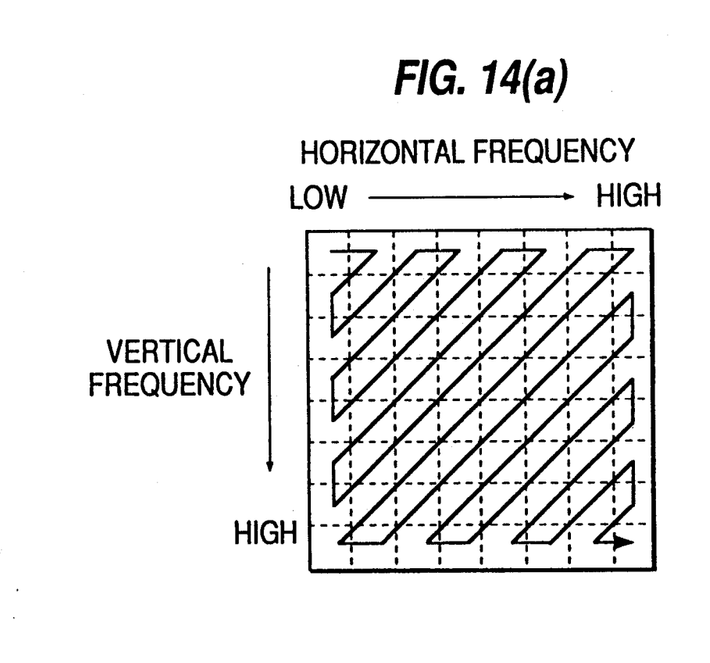
FIGS. 14(a)-14(b) are reordering diagrams of two-dimensionally orthogonally transformed data.
Figure 14B:
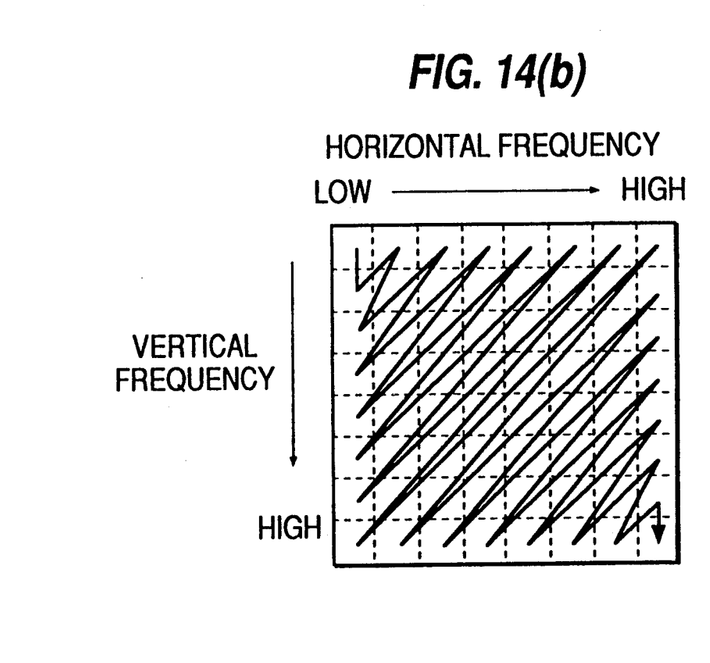

In the foregoing embodiments, the sequence of the orthogonally transformed data was reordered into the sequence of low frequency by the final reordering device. Usually, however, the video signal is orthogonally transformed two-dimensionally, in the horizontal and vertical directions. In such a case, the orthogonally transformed data can be reordered in the sequence of low two-dimensional frequency. Therefore, instead of one-dimensional transformation in the foregoing embodiments, the orthogonally transformed data may be reordered in the zigzag sequence as shown in FIG. 14 (a) or FIG. 14 (b).

What is claimed is:

1. A high efficiency coding apparatus comprising: an orthogonal transforming device for performing at least two types of orthogonal transformations on a digital video input signal formed in blocks and for selecting one output signal of the orthogonal transforming device and for reordering the selected signal; and a device for coding the reordered selected signal by a specific technique regardless of the type of orthogonal transformation; wherein the orthogonal transforming device orthogonally transforms in two types, that is, an orthogonal transformation for reordering in a sequence of frequency by a two-dimensional orthogonal transformation of vertical m points × horizontal for reordering in a sequence of frequency by a three-dimensional orthogonal transformation of vertical (m/2) points × horizontal n points × time on signals in each field at a position corresponding to a signal in the frame.

2. A high efficiency coding apparatus of claim 1, wherein the data after the three-dimensional orthogonal transformation of (m/2) points × n points × 2 points on the signals in the field are reordered in a sequence of a sum and a difference of frequency components between fields alternately.

3. A high efficiency coding apparatus of claim 1, wherein the data after the three-dimensional orthogonal transformation of (m/2) points × n points × 2 points on the signals in the field are reordered in a sequence of disposing differences of frequency components between fields after all data of sums of the frequency components between fields.

4. A high frequency coding apparatus of claim 1, wherein the orthogonal transforming device comprises: a first reordering device for reordering the input signal, a first butterfly calculation device for performing butterfly calculation or addition and subtraction of data on an output signal of the first reorder device; a first multiplication and butterfly calculation device for performing multiplication & butterfly calculation on an output signal of the first butterfly calculation device; a second reordering device for reordering an output signal of the first multiplication and butterfly calculation device; a second butterfly calculation device for performing butterfly calculation on an output signal of the second reordering device; a second multiplication & butterfly calculation device for performing multiplication and butterfly calculation on an output signal of the second butterfly calculation device; and a third reordering device for reordering an output signal of the second multiplication & butterfly calculation device, and either eight-point cosine transformation or two-dimensional four-point cosine transformation is performed by changing over reordering sequences of the first, second and third reordering devices, and coefficients of multiplications of the first and second multiplication & butterfly calculation devices by an external changeover signal.

5. A high efficiency coding apparatus of claim 4, wherein the orthogonal transforming device performs two types of orthogonal transformations, that is an orthogonal transformation for reordering in a sequence of frequency by a two-dimensional orthogonal transformation of vertical 8 points × horizontal n points on signals in a frame, and an orthogonal transformation for reordering in a sequence of frequency by a three-dimensional orthogonal transformation of vertical 4 points × horizontal n points × time on signals in each field at a position corresponding to a signal in the frame.

6. A high efficiency coding apparatus of claim 5 transformation of 4 points × n points × 2 points on the signals in each field are reordered in a sequence of a sum and a difference of frequency components between fields alternately.

7. A high efficiency coding apparatus of claim 5, wherein the data after the three-dimensional orthogonal transformation of 4 points × n points × 2 points of the signals in each field are reordered in a sequence of placing differences of frequency components between fields after all data of sums of the frequency components between fields.

8. A high efficiency decoding apparatus comprising: a decoding device for decoding a coded input signal; an orthogonal transforming device for reordering an output signal of the decoding device and for performing at least two types of orthogonal transformations on the reordered output signal of the decoding device; wherein the orthogonal decoding device performs two types of orthogonal transformations, that is, an orthogonal transformation of vertical m points × horizontal n points on signals in a frame, and an orthogonal transformation for performing a three-dimensional orthogonal transformation of vertical (m/2) points × horizontal n points × time on signals in each field.

9. A high efficiency decoding apparatus of claim 8, wherein the orthogonal transforming device comprises: a first reordering device for reordering the input signal; a first multiplication & butterfly calculation device for performing multiplication and butterfly calculation or addition and subtraction of data on an output of the first reordering device; a first butterfly calculation device for performing butterfly calculation on an output signal of the first multiplication & butterfly calculation device; a second reordering device for reordering an output signal of the first butterfly calculation device; a second multiplication & butterfly calculation device for performing multiplication and butterfly calculation on an output signal of the second reordering device; a second butterfly calculation device for performing butterfly calculation on an output signal of the second multiplication & butterfly calculation device; and a third reordering device for reordering an output signal of the second butterfly calculation device, and either an eight-point inverse cosine transformation or a two-dimensional four-point inverse cosine transformation is performed by changing over reordering sequences of the first, second and third reordering devices and coefficients of multiplications of the first and second multiplication & butterfly calculation devices by an external changeover signal.

* * * * *

UNITED STATES PATENT AND TRADEMARK OFFICE
CERTIFICATE OF CORRECTION

PATENT NO. : 5,196,930        Page 1 of 2

DATED : Mar. 23, 1993

INVENTOR(S) : Shinya Kadono et al.

It is certified that error appears in the above-identified patent and that said Letters Patent is hereby corrected as shown below:

Column 9, line 42, after "horizontal" insert --n points on signals in a frame, and an orthogonal transformation--.

Column 9, line 67, change "&" to --and--.

Column 10, line 5, change "&" to --and--.

Column 10, line 10, change "&" to --and--.

Column 10, line 15, change "&" to --and--.

Column 10, line 29, after "claim 5" insert --wherein the data after the three-dimensional orthogonal--.

Column 10, line 36, change second occurrence of "of" to --on--.

Column 10, line 47, change "decoding" to --transforming--.

Column 10, line 57, change "&" to --and--.

Column 10, line 62, change "&" to --and--.

Column 10, line 65, change "&" to --and--.

Column 11, line 2, change "&" to --and--.

UNITED STATES PATENT AND TRADEMARK OFFICE
CERTIFICATE OF CORRECTION

PATENT NO. : 5,196,930
DATED : March 23, 1993
INVENTOR(S) : Shinya Kadono et al

It is certified that error appears in the above-indentified patent and that said Letters Patent is hereby corrected as shown below:

Column 12, line 3, change "&" to --and--

Signed and Sealed this

Eighteenth Day of January, 1994

Attest:

BRUCE LEHMAN

*Attesting Officer*  *Commissioner of Patents and Trademarks*